US010982958B2

(12) United States Patent
Lombardi et al.

(10) Patent No.: US 10,982,958 B2
(45) Date of Patent: Apr. 20, 2021

(54) LASER LEVEL PENDULUM ARREST

(71) Applicant: STANLEY BLACK & DECKER INC., New Britain, CT (US)

(72) Inventors: Keith M. Lombardi, Avon, CT (US); Ido Aharon Stern, Raanana (IL); Bruce Eidinger, Meriden, CT (US); Gilad Moisa, Hod H'Sharon (IL)

(73) Assignee: Stanley Black & Decker Inc., New Britain, CT (US)

( * ) Notice: Subject to any disclaimer, the term of this patent is extended or adjusted under 35 U.S.C. 154(b) by 205 days.

(21) Appl. No.: 16/100,355

(22) Filed: Aug. 10, 2018

(65) Prior Publication Data
US 2019/0072385 A1 Mar. 7, 2019

Related U.S. Application Data

(60) Provisional application No. 62/554,740, filed on Sep. 6, 2017.

(51) Int. Cl.
*G01C 15/00* (2006.01)
*G01P 15/08* (2006.01)

(52) U.S. Cl.
CPC .......... *G01C 15/008* (2013.01); *G01C 15/002* (2013.01); *G01C 15/004* (2013.01); *G01P 15/0891* (2013.01)

(58) Field of Classification Search
CPC ..... G01C 15/008; G01C 15/004; G01B 11/27
USPC .......................................... 33/286, 283, 291
See application file for complete search history.

(56) References Cited

U.S. PATENT DOCUMENTS

| 5,539,990 | A | * | 7/1996 | Le | G01C 15/004 33/283 |
| 5,680,208 | A | * | 10/1997 | Butler | G01C 15/004 33/273 |
| 5,782,003 | A | * | 7/1998 | Bozzo | G01C 15/004 33/291 |
| 6,763,595 | B1 | * | 7/2004 | Hersey | G01C 15/004 33/286 |

(Continued)

FOREIGN PATENT DOCUMENTS

| EP | 2306147 | 4/2011 |
| EP | 3418687 | 12/2018 |

(Continued)

OTHER PUBLICATIONS

Search report from EPO for application 18 192 818.5 EP ESSR, dated Jan. 2, 2019.

*Primary Examiner* — Christopher W Fulton
(74) *Attorney, Agent, or Firm* — Stephen R. Valancius

(57) ABSTRACT

A laser generating device including a housing and a laser module assembly. The laser module assembly is at least partially housed in the housing. The laser module includes a pendulum assembly which rotates under the effects of gravity and a laser module on the pendulum assembly. The laser module includes a laser generator which generates a laser beam. The laser generating device also includes a pendulum lock which is movable from an unlocked position to a locked position. When the pendulum lock is in the locked position, it prevents the pendulum assembly from rotating. A sensor is provided to detect a freefall condition. The pendulum lock moves from the unlocked position to the locked position when the sensor detects the freefall condition.

19 Claims, 6 Drawing Sheets

(56) References Cited

U.S. PATENT DOCUMENTS

| | | | |
|---|---|---|---|
| 6,763,596 B1 * | 7/2004 | Puri | G01C 15/002 |
| | | | 33/227 |
| 6,914,930 B2 | 7/2005 | Raskin et al. | |
| 7,328,615 B2 | 2/2008 | Kwon et al. | |
| 7,382,567 B2 | 6/2008 | Liao et al. | |
| 7,403,131 B2 | 7/2008 | Gossett et al. | |
| 7,493,701 B2 | 2/2009 | Chen | |
| 7,523,558 B2 | 4/2009 | Milligan et al. | |
| 7,900,542 B2 | 3/2011 | Kapolnek | |
| 8,044,818 B2 | 10/2011 | Tysowski et al. | |
| 8,344,901 B2 | 1/2013 | Tysowski et al. | |
| 8,814,641 B2 | 8/2014 | Rabin | |
| 8,933,801 B2 | 1/2015 | Sweeney et al. | |
| 8,959,783 B2 | 2/2015 | Kumagai et al. | |
| 9,364,748 B2 | 1/2016 | Rabin | |
| 9,441,967 B2 * | 9/2016 | Ranieri | G01C 15/004 |
| 2007/0044331 A1 * | 3/2007 | Yung | G01C 15/04 |
| | | | 33/286 |
| 2007/0113745 A1 * | 5/2007 | Miyata | G01C 15/004 |
| | | | 101/3.1 |
| 2008/0047153 A1 * | 2/2008 | Bona | G01C 15/105 |
| | | | 33/283 |
| 2008/0209745 A1 * | 9/2008 | Tamamura | G01C 15/02 |
| | | | 33/286 |
| 2009/0193671 A1 * | 8/2009 | Sergyeyenko | G01C 15/02 |
| | | | 33/290 |
| 2014/0267703 A1 | 9/2014 | Taylor et al. | |
| 2015/0000144 A1 * | 1/2015 | Yuen | G01B 7/30 |
| | | | 33/228 |
| 2016/0054354 A1 | 2/2016 | Keal et al. | |
| 2016/0279520 A1 | 9/2016 | Rabin | |
| 2018/0328730 A1 * | 11/2018 | Geise | F16D 3/40 |
| 2019/0011246 A1 | 1/2019 | Yuen et al. | |

FOREIGN PATENT DOCUMENTS

| | | |
|---|---|---|
| JP | 2005114405 | 4/2005 |
| WO | 20120049410 | 4/2012 |
| WO | 20120049411 | 4/2012 |

* cited by examiner

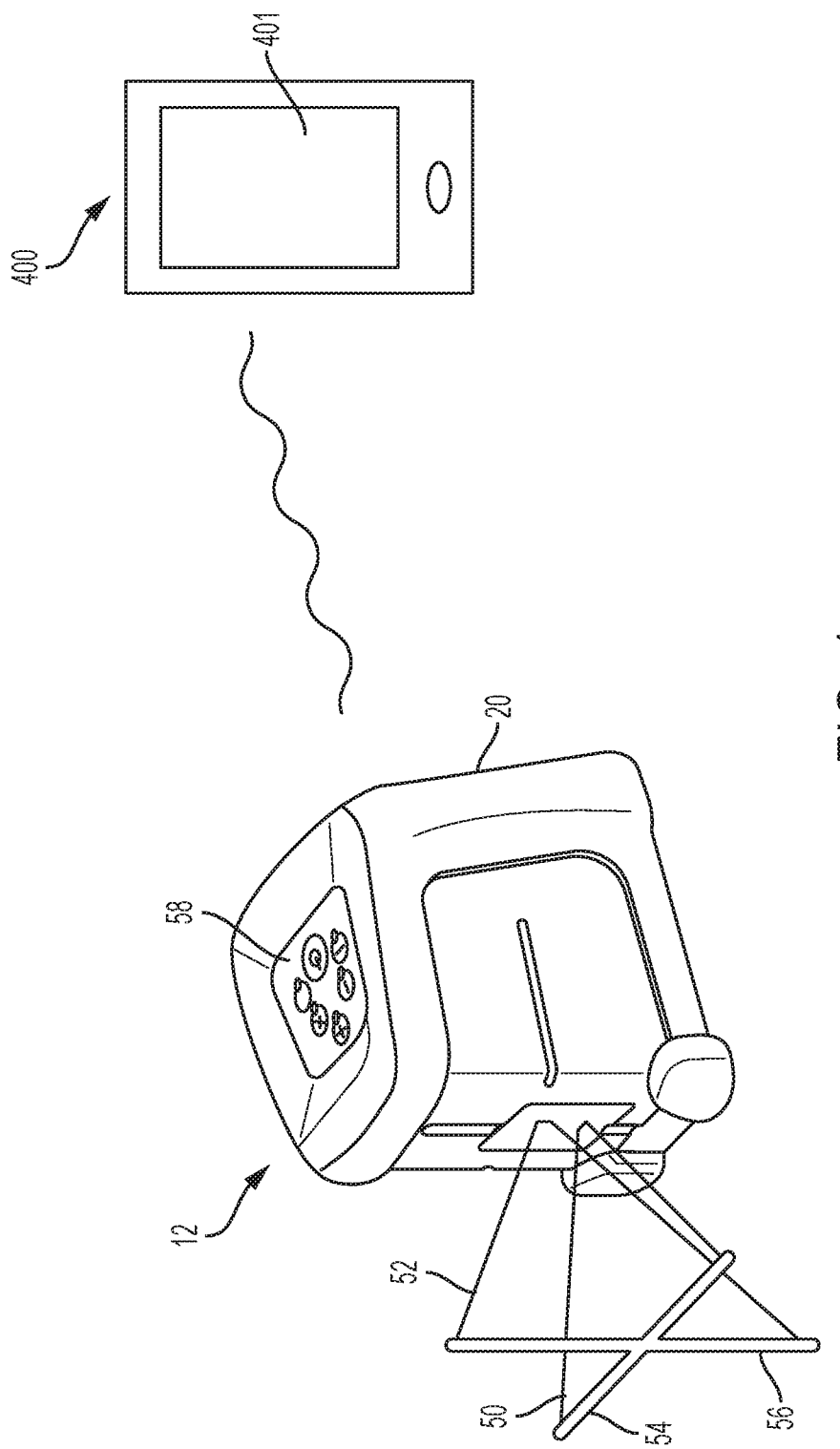

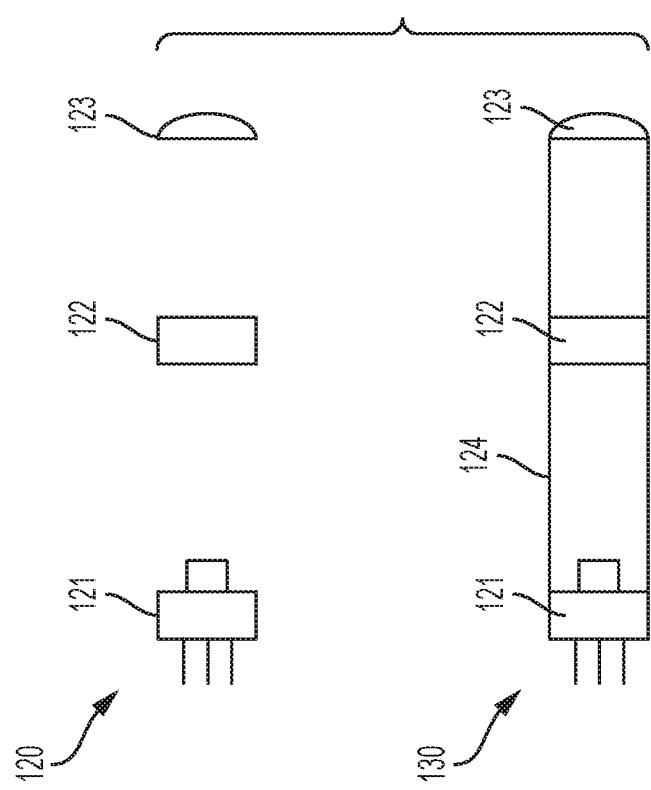

LASER LEVEL PENDULUM ARREST

CROSS-REFERENCE TO RELATED APPLICATION

This application claims the benefit of U.S. Provisional Application No. 62/554,740 filed on Sep. 6, 2017, entitled Laser Level Pendulum Arrest. The entire contents of U.S. Provisional Application No. 62/554,740 are incorporated herein by reference.

FIELD OF THE INVENTION

The present invention relates to laser levels, particularly laser levels with a system for arresting the movement of a pendulum.

BACKGROUND

There are various existing laser levels. It is desired to provide a laser level with a system for arresting the movement of a pendulum.

SUMMARY

According to an aspect, there is an exemplary embodiment including a laser generating device. The laser generating device includes a housing and a laser module assembly at least partially housed in the housing. The laser module assembly includes a pendulum assembly configured to rotate under the effects of gravity and a laser module on the pendulum assembly. The laser module includes a laser generator, the laser generator generating a laser beam. The laser generating device further includes a pendulum lock movable from an unlocked position to a locked position, wherein when the pendulum lock is in the locked position it prevents the pendulum assembly from rotating. The laser generating device may also include a sensor configured to detect a freefall condition and, the pendulum lock moves from the unlocked position to the locked position when the sensor detects the freefall condition.

The laser generating device may further include a lock actuator, the lock actuator being movable from a blocking position to a release position.

In the blocking position, the lock actuator may block the pendulum lock from moving to the locked position.

In the release position, the lock actuator may allow the pendulum to move to the locked position.

The lock actuator may move from the blocking position to the released position in response to the sensor detecting a freefall condition.

The sensor may be an accelerometer.

The pendulum lock may include a biasing member which biases the pendulum lock towards the locked position.

The laser level may further include a user actuated switch which moves the pendulum lock to the unlocked position.

The biasing member may include a spring.

The laser module assembly may produce at least one line which is configured to project against a surface outside the housing.

The laser module assembly may produce a first line which projects against a surface outside the housing and a second line which projects against the surface.

The first line is generally perpendicular to the second line.

The laser generating device may project multiple lines onto a surface remote from the laser generating device.

The laser generating device may project one or more dots onto a surface remote from the laser generating device.

The laser generating device may project a rotating laser onto a surface remote from the laser generating device.

The laser generating device housing may be made of plastic.

The laser generating device housing may be made of multiple plastic housing parts attached together.

According to another aspect, there is an exemplary embodiment of a laser generating device which includes a housing and laser module assembly at least partially housed in the housing. The laser module includes a pendulum assembly configured to rotate under the effects of gravity and a laser module on the pendulum assembly. The laser module includes a laser generator, the laser generator generating a laser beam which is projected onto a surface outside of the housing to create a line. The laser generating device may also include a pendulum lock movable from an unlocked position to a locked position such that when the pendulum lock is in the locked position it prevents the pendulum assembly from rotating. The laser generating device may also include a sensor disposed in the housing and configured to detect a freefall condition and when the pendulum lock moves from the unlocked position to the locked position when the sensor detects the freefall condition.

The laser generating device further includes a controller housed in the housing and operatively connected to the sensor.

The laser generating device further includes a lock actuator, the lock actuator being movable from a blocking position to a release position.

In the blocking position, the lock actuator may block the pendulum lock from moving from the unlocked position to the locked position.

In the release position, the lock actuator may allow the pendulum to move to the locked position.

The lock actuator may include a solenoid for moving the lock actuator.

The controller may control operation of the solenoid.

The laser generating device may further include a wireless transmitter.

The wireless transmitter may transmit a signal to a remote electronic device when the sensor detects a freefall condition.

The remote electronic device may provide a display to a user in response to detection of the freefall condition.

The remote electronic device may be a computing device.

The laser generating device may further include a wireless receiver configured to receive wireless signals.

The controller may be configured to move the lock actuator to the release position in response to receiving a lock actuation command through the wireless receiver from a remote electronic device.

BRIEF DESCRIPTION OF THE DRAWINGS

FIG. 1 illustrates a perspective view of a laser level according to an exemplary embodiment;

FIG. 8 are side views of laser modules of the laser level of the exemplary embodiment.

DETAILED DESCRIPTION OF EXEMPLARY EMBODIMENTS

Figure 3:
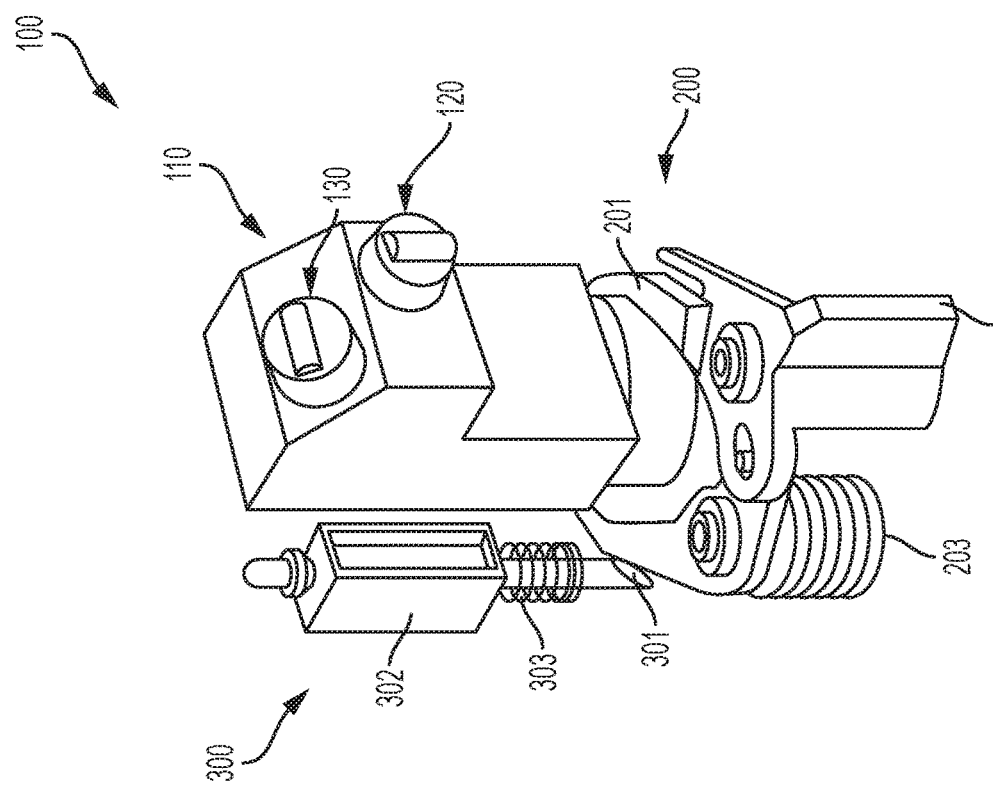
FIG. 3 is another perspective view of a laser module assembly of the laser level according to the exemplary embodiment.

An exemplary embodiment according to the present application is shown in FIGS. 1-8. FIG. 1 illustrates a laser generating device in the form of a cross-line laser level 12. The cross-line laser level 12 includes a housing 20. Planar beams 50 and 52 project out of the housing 20 to form lines 54 and 56. At least when the housing 20 is placed on a flat, horizontal surface, planar beam 50 and line 54 are horizontal and planar beam 52 and line 56 are vertical.

Figure 2:
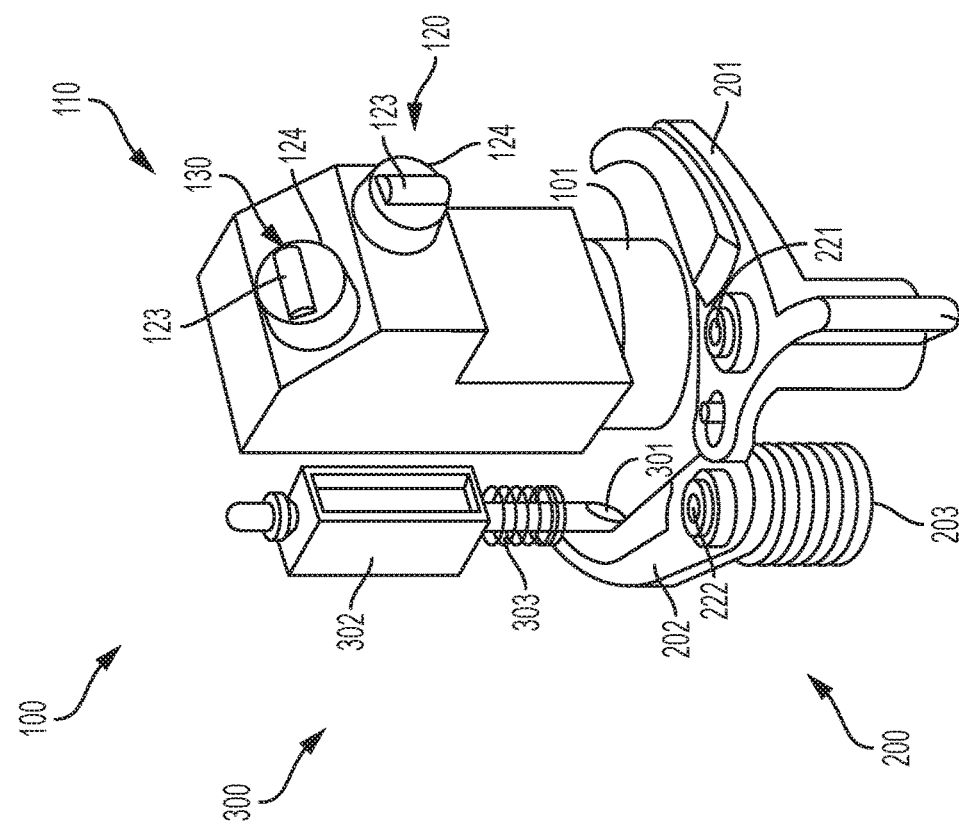
FIG. 2 is a perspective view of a laser module assembly of the laser level according to the exemplary embodiment.

A laser module assembly 100 is housed inside of the housing 20, and shown in FIGS. 2 and 3. The laser module assembly 100 includes a pendulum 110. The pendulum 110 is designed to swing under the effects of gravity to provide a degree of self-leveling. A top of the pendulum 110 is attached to an inside of the housing 20 in a manner to allow such rotation. This may be done by a simple hinge, multiple axis hinge, wires, or in other manners, as is known in the art. Various self-leveling mechanisms are shown in U.S. Pat. Nos. 6,763,595; 6,763,596 and 5,539,990 and the present disclosure could be applied to those configurations. U.S. Pat. Nos. 6,763,595; 6,763,596 and 5,539,990 are each hereby incorporated by reference in their entireties.

A pair of laser modules 120 and 130 are held on the pendulum 110. The laser modules 120 and 130 are identical, except that they project laser beams at different orientations. Particularly, the laser module 120 projects the beam 50 and line 54 and the laser module 130 projects the beam 52 and line 56. Since the laser modules 120, 130 are disposed on a pendulum 100 that is self-leveling, the laser modules 120, 130 project beams 50, 52 horizontally even when the housing 20 is not disposed on a perfectly flat horizontal surface. That is, if the housing 20 is held at a slight angle, the pendulum 110 rotates so that the laser modules 120, 130 maintain the appropriate orientations for projecting horizontally and vertically.

FIG. 8 illustrates the laser modules 120 and 130. As noted above, the laser modules 120, 130 are similar, except in orientation. As shown in FIG. 8, the laser modules 120, 130 each have a laser diode 121, which generates a laser beam. They also have a collimator lens 122 and a prism 123, which convert the laser beams to lines. The laser module 130 is shown with a holding cylinder 124. The holding cylinder 124 holds the laser diode 121, collimator lens 122 and prism 123 in place and aligned properly. The holding cylinder 124 is omitted from the illustration of laser module 120 of FIG. 8. Additionally, an end of the holding cylinder 124 holding the prism 123 is shown in FIGS. 2-5. In other embodiments, the laser modules may have more differences.

FIGS. 2 and 3 illustrate an internal structure of the laser level 12. As shown in FIGS. 2 and 3, the laser level 12 includes a pendulum lock 200. The pendulum lock 200 has a pair of arms 201 and 202. It also has a biasing spring 203 which biases the arms 201 and 202 in a direction of rotating towards one another. A setting projection 204 is connected to arm 201.

The pendulum lock 200 is shown in an open (or unlocked) position in FIG. 2 and a closed (or locked) position in FIG. 3. In the open position of FIG. 2, the pendulum 110 is able to swing to a self-leveled position. This allows the laser level 12 to project lines 54, 56 horizontally and vertically even when the housing 20 is tilted. In the closed position shown in FIG. 3, the arms 201, 202 of the pendulum lock 200 clamp down on a lower portion 101 of the pendulum 110. Thus, in the closed position of FIG. 3, the pendulum lock 200 limits movement of the pendulum 110.

A user may wish to operate the laser level 12 with the pendulum lock 200 in the closed position in order to provide a fixed orientation for the projection laser lines 54, 56. That is, a user may simply wish for the laser lines 54, 56 to be at a fixed orientation with respect to the housing 20 rather than be free to rotate to a self-leveled position. Additionally, having the pendulum lock 200 in the closed position may provide protection for the laser module assembly 100.

The arm 201 is operatively linked with the arm 202 through a linking section 210 so that the arms 201 and 202 move together. The linking section 210 includes a opening 211 which is integrally formed with the arm 201 and a pin 212 which is integrally formed with the arm 202. The arm 201 includes a pivot 221 about which the arm 201 pivots. Similarly, the arm 202 includes a pivot 222, about which the arm 202 pivots. The biasing member in the form of a spring 203 is disposed at the pivot 222.

The linking section 210 functions such that both arms move simultaneously between the opening and closed positions. In particular, the opening 211 acts as a cam, so that when the pin 212 moves, it moves along the opening 211 and causes the arm 201 to rotate. Conversely, when the arm 201 moves and the opening 211 moves along with it, the opening 211 pushes the pin 212 along the opening 211 so that the arm 202 which is connected to the pin 212 rotates.

As shown in FIGS. 2 and 3, a lock actuator 300 is located inside the housing 20 of the laser level 12 and actuates the pendulum lock 200. The lock actuator 300 includes a blocking projection 301, a solenoid 302 and a biasing spring 303. The lock actuator 300 is in a blocking position in FIG. 2. In the blocking position, the blocking projection 301 prevents the arm 202 of the pendulum lock 200 from moving to the closed position of FIG. 3. Thus, the lock actuator 300 keeps the pendulum lock 200 in the open position shown in FIG. 2 and the pendulum 110 is able to move to self-leveling positions.

The solenoid 302 of the lock actuator 300 is operable to move the blocking projection 301 to the release position shown in FIG. 3. In the release position, the blocking projection 301 is moved out of the way of the arm 202 of the pendulum lock. This allows the lock arms 201 and 202 to clamp the lower portion 101 of the pendulum 110. The arms 201 and 202 are moved to the closed position of FIG. 3 by the biasing spring 203 which biases the arms 201 and 202 towards the lower portion 101 of the pendulum 110 and each other. When the pendulum lock 200 is in the closed position in FIG. 3, the arms 201 and 202 prevent movement of the pendulum 110 so that it does not rotate or self-level. As discussed above, this locked position of the pendulum 110 may be desirable for a user and may provide protection to the various parts of the laser module assembly 100.

Figure 5:
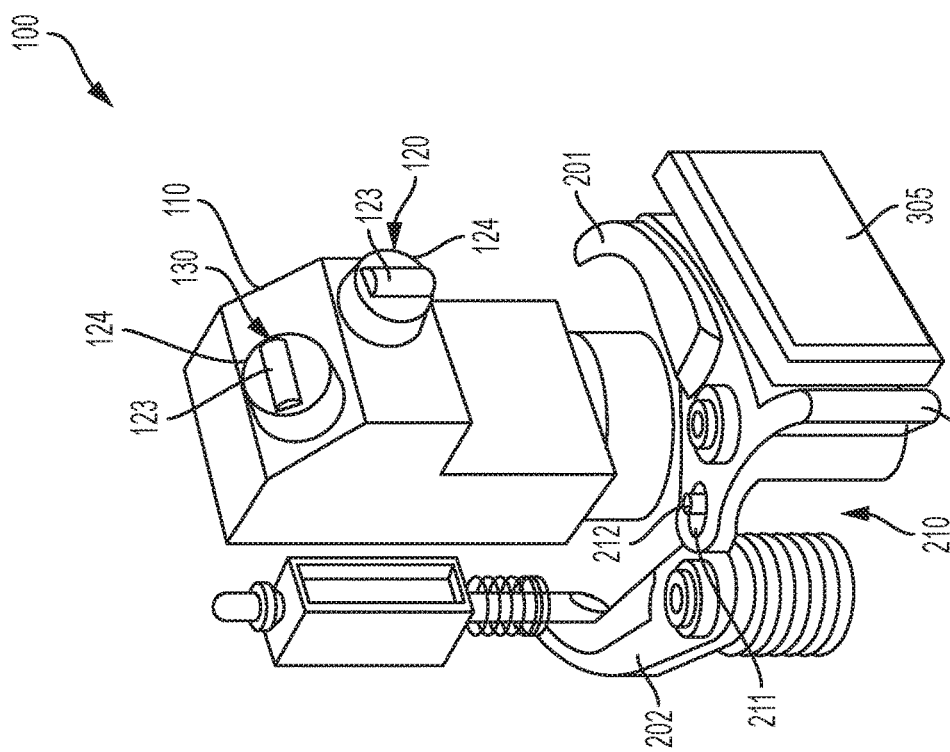
FIG. 5 is another perspective view of a laser module assembly of the laser level according to the exemplary embodiment.
Figure 4:
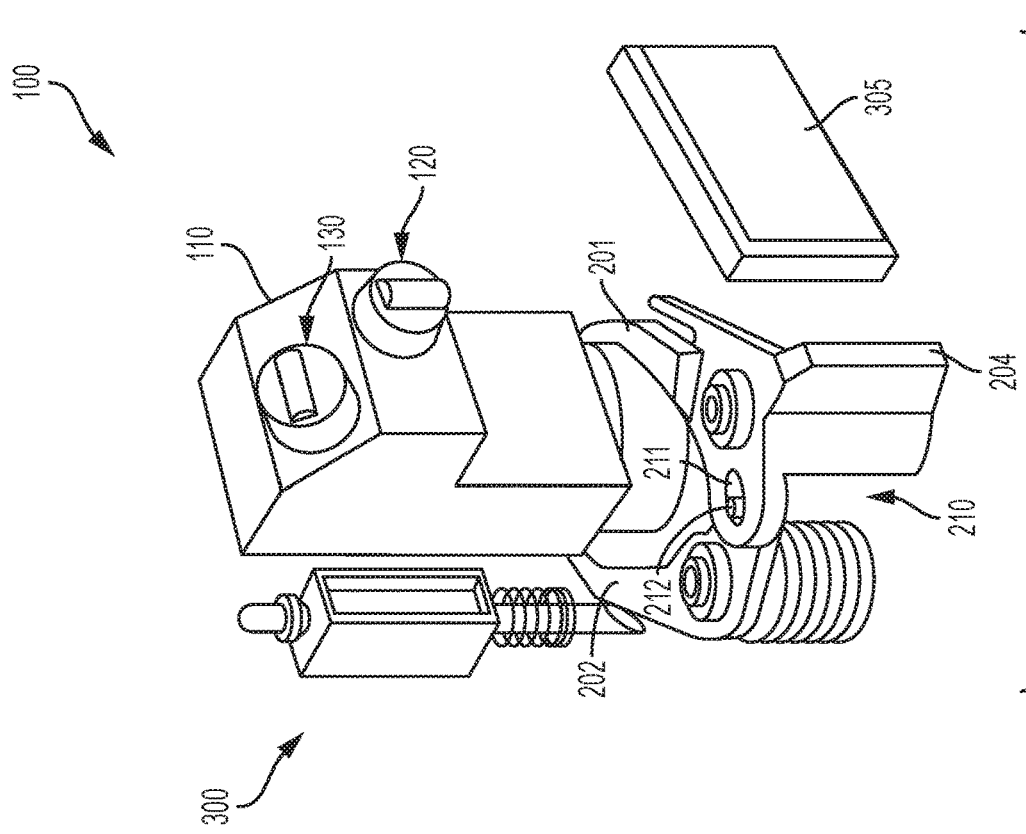
FIG. 4 is another perspective view of a laser module assembly of the laser level according to the exemplary embodiment.

FIGS. 4 and 5 illustrate a slide actuator 305 for opening the pendulum lock 200. FIG. 4 illustrates the pendulum lock 200 in a closed position where it clamps the lower portion 101 of the pendulum 110 to hold the pendulum 100 in place. FIG. 5 illustrates the pendulum lock 200 in the open position where the pendulum 100 may rotate. As shown in FIGS. 4 and 5, the slide actuator 305 can be moved, by sliding, so that it abuts against and pushes the setting projection 204. As the slide actuator 305 pushes against the setting projector, it moves the setting projection 204. As the setting projection 204 rotates about the pivot 221, the arms 201 and 202 also rotate back to the open position shown in FIG. 5.

As shown in FIG. 5, the blocking projection 301 includes an end with a sloped surface. As will be appreciated, as the arm 202 rotates from the closed position of FIG. 4 to the open position of FIG. 5, the arm 202 contacts the sloped surface. As the arm 202 moves against the sloped surface, it pushes the blocking projection 301 upwards so that the arm 202 can move past the blocking projection 301. After the arm 202 moves past the blocking projection 301, it snaps back into a blocking position under the force of the biasing member, spring 303.

The slide actuator 305 may project out of the housing 20 so that it may be moved by a user. In other embodiments, the slide actuator 305 may be linked to a button, switch or other actuator a user may actuate to move the slide actuator 305.

The lock actuator 300 may be engaged in multiple scenarios. As described below, it may be engaged by a user using a remote computing device 400, a button on the user interface 58 or automatically in response to a free-fall condition.

Figure 6:
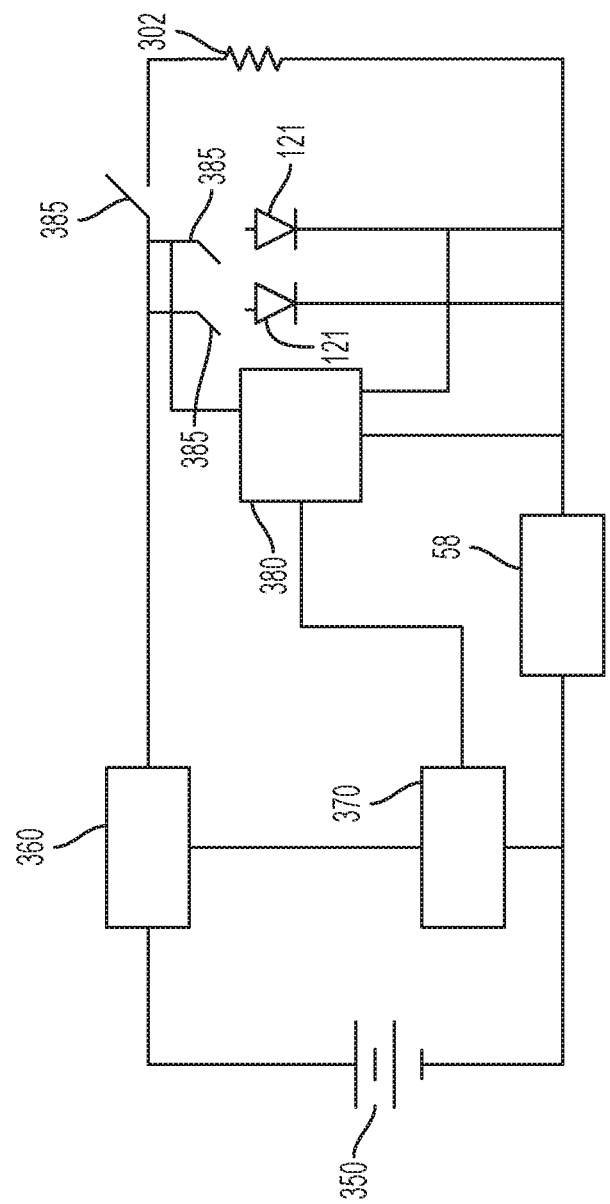
FIG. 6 schematic circuit diagram of the laser level according to the exemplary embodiment.

A schematic of the laser level 12 is shown in FIG. 6. As shown in FIG. 6, there is a battery 350, a sensor 360, a wireless receiver/transmitter 370 and a microprocessor 380. The battery 350 powers the various components and the solenoid 302. The sensor 360 is configured to detects when the laser level 12 is in a free-fall condition. The sensor 360 may be attached, for example, to the housing 20. In other embodiments, the sensor 360 may be attached to the pendulum 110 or other parts of the laser level 12. The sensor 360 may be an accelerometer.

Figure 7:
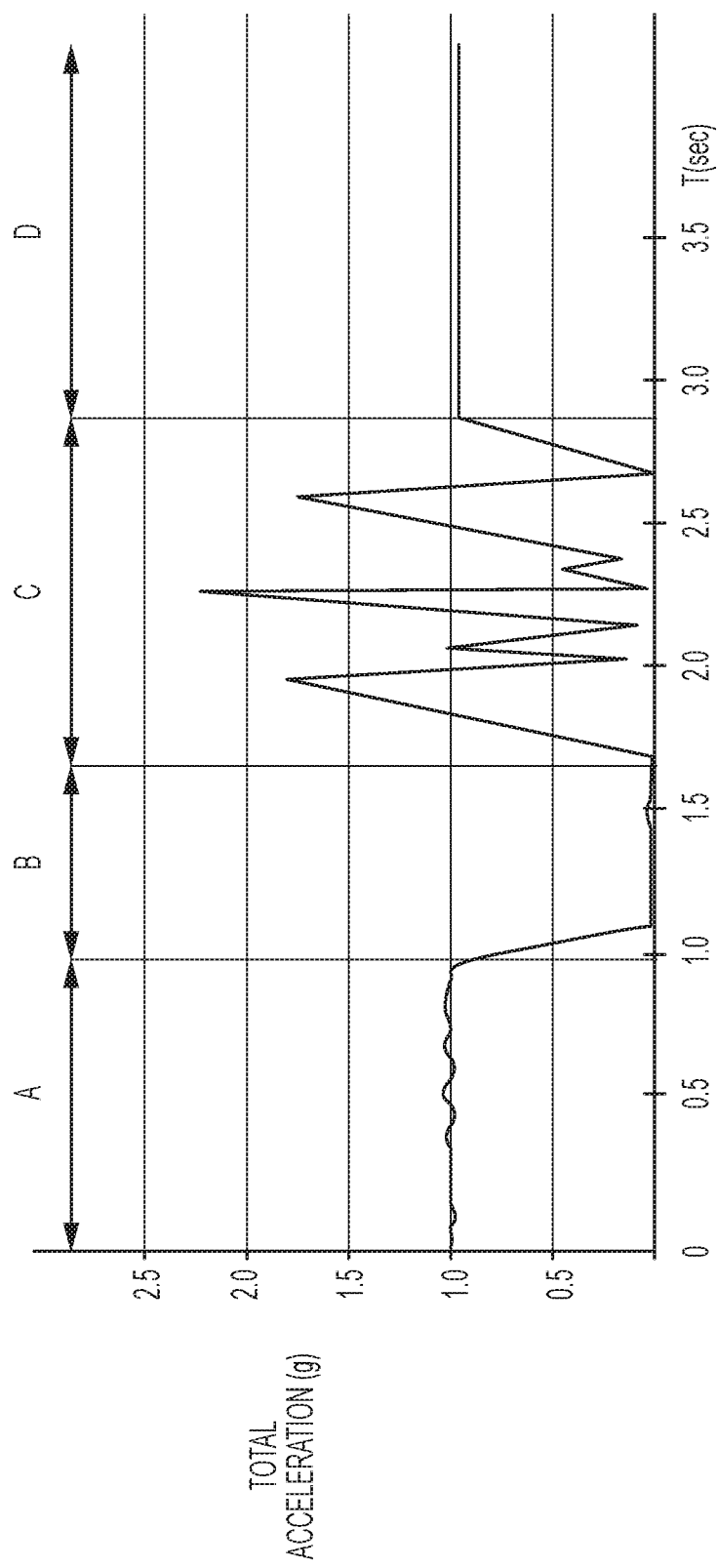
FIG. 7 is a graph of a sensor reading of a sensor of the laser level of the exemplary embodiment.

FIG. 7 illustrates a graph of measured acceleration versus time, which may be measured by the sensor 360. Acceleration in the graph is measured on a g-force scale, in which 1.0 is typical gravity on earth. Time (t) on the scale is measured in seconds.

In FIG. 7, the period of A shows the sensor 360 measuring a g-force of approximately 1.0. In this time period A, the laser level 12 is sitting still. In time period B, the measured g-force quickly falls to zero or near zero. This indicates that the laser level 12 is falling. In the time period C, the measured g-force fluctuates greatly. This time period C indicates that the laser level 12 has hit the ground or other object and is bouncing. Finally, in time period D, the laser level 12 has come to rest and the sensor 360 again measures approximately 1.0 g.

Various accelerometers or other sensors determine a free-fall condition in different ways. For example, an accelerometer may determine that there is a free-fall condition when the measured g-force hits zero or near zero. In some instances, the accelerometer may require that the measured acceleration be below a certain amount for a certain amount of time. For example, the accelerometer determines that there is a free-fall condition when it measures a g-force of less than 0.1 for more than 0.1 seconds. The particulars of the required g-force or time can vary. It is contemplated that the free-fall may be detected by the sensor 360 in any of a variety of ways, including those described in U.S. Pat. Nos. 8,933,801; 7,328,615 or 8,344,901. U.S. Pat. Nos. 8,933, 801; 7,328,615 and 8,344,901 are hereby incorporated by reference.

Once a free fall is detected by the sensor 360, the microprocessor 380 cause the lock actuator 300 to retract. Specifically, the solenoid 302 retracts the blocking projection 301 so that it moves away from the blocking position shown in FIG. 2. This allows the arms 201 and 202 to clamp onto the bottom portion 101 of the pendulum 110, as shown in FIG. 3 and described above. Thus, when the laser level 12 falls, the laser module assembly 100 is held steady, which helps to prevent damage.

In other embodiments, the lock actuator 300 may retract the blocking projection 301 to activate the pendulum lock 200 when other events are detected. For example, alternatively or additionally, the pendulum lock 200 may be engaged automatically when the sensor detects that the laser level 12 has hit an object. This may be based on the sensor detecting a spike in g-force after a fall in g-force. For example, a spike in g-force above 1.0 after reaching near zero (0.2 or less).

The pendulum lock 200 may also be activated by a user sending a signal to the laser level 12 through a wireless transmitter/receiver 370.

As shown in FIG. 6, the laser level 12 also includes a wireless transmitter/receiver 370. In the exemplary embodiment shown in FIG. 6, the wireless transmitter/receiver 370 is shown schematically as one component. In various embodiments it may be one or two components. Additionally, some embodiments may have only a receiver or only a transmitter and only the functionality associated therewith.

The wireless transmitter/receiver 370 is configured to transmit and receiver wireless signals. The wireless signals may be received via a Bluetooth protocol, WiFi, Zigbee, infrared or other wireless transmission methods. As shown, the wireless transmitter/receiver 370 is connected to the microprocessor 380.

A user may use a computing device 400 separate from the laser level 12 to send a wireless signal to the wireless transmitter/receiver 370. The wireless signal may be a command to activate the pendulum lock 200. As described above, this is done by retraction of the blocking projection 301 so that it moves away from the blocking position shown in FIG. 2 allowing the arms 201 and 202 clamp onto the bottom portion 101 of the pendulum 110, as shown in FIG. 3. In this manner, a user can activate the pendulum lock 200 remotely.

The computing device 400 may be a personal computer (PC), a tablet, a laptop, a smart phone or another computing device 400. The computing device may have an input so that users can input data and commands onto the computing device and a display, such as a screen 401 for displaying information to the user. The screen 401 may be a touch screen that functions as the input.

Information from the sensor 360 may also be transmitted to the remote computing device 400 and displayed on the screen 401. For example, the computing device 400 may display that the laser level 12 is in free-fall, that the laser level 12 has hit an object or that the laser level 12 is at rest. Other information to and from the laser level 12 may also be transmitted, including commands to the laser level 12 and information about the status of the laser level 12, such as whether it is on or off.

As shown in FIGS. 1 and 6, the laser level 12 also includes a user interface 58. The user interface 58 includes a button which allows the user to actuate the pendulum lock 200. The user simply depresses the appropriate button on the user interface 58 and the pendulum lock 200 is activated according to the method described above.

As shown in FIG. 6, the laser diodes 121 of the laser modules may be powered by the battery 350. Switches 385 may be opened and closed to provide the appropriate connections between the battery 350, solenoid 302 and other components. The battery may be, for example, alkaline batteries or a power tool battery pack.

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A laser generating device, comprising:
    a housing;
    a laser module assembly, the laser module assembly at least partially housed in the housing, the laser module assembly including a pendulum assembly configured to rotate under the effects of gravity and a laser module on the pendulum assembly;
    wherein the laser module includes a laser generator, the laser generator generating a laser beam;
    a pendulum lock movable from an unlocked position to a locked position, wherein when the pendulum lock is in the locked position it prevents the pendulum assembly from rotating;
    a sensor configured to detect a freefall condition;
    wherein the pendulum lock moves from the unlocked position to the locked position when the sensor detects the freefall condition;
    further comprising a lock actuator, the lock actuator being movable from a blocking position to a release position;
    wherein in the blocking position, the lock actuator blocks the pendulum lock from moving to the locked position;
    wherein in the release position, the lock actuator allows the pendulum lock to move to the locked position;
    wherein the lock actuator moves from the blocking position to the released position in response to the sensor detecting a freefall condition; and
    wherein a user operated actuator is configured to move the pendulum lock from the locked position to the unlocked position.

2. The laser generating device of claim 1, wherein the sensor comprises an accelerometer.

3. The laser generating device of claim 1, wherein the pendulum lock includes a biasing member which biases the pendulum lock towards the locked position.

4. The laser generating device of claim 3, wherein the biasing member comprises a spring.

5. The laser generating device of claim 1, wherein the laser module assembly produces at least one line which is configured to project against a surface outside the housing.

6. The laser generating device of claim 1, wherein the laser module assembly produces a first line which projects against a surface outside the housing and a second line which projects against the surface; and
    wherein the first line is generally perpendicular to the second line.

7. The laser generating device of claim 1, wherein the free-fall condition comprises a g-force under a predetermined amount for a predetermined amount of time.

8. The laser generating device of claim 1, wherein the free-fall condition comprises a g-force under 0.1 for a predetermined amount of time.

9. A laser generating device, comprising:
    a housing;
    a laser module assembly, the laser module assembly at least partially housed in the housing, the laser module assembly including a pendulum assembly configured to rotate under the effects of gravity and a laser module on the pendulum assembly;
    wherein the laser module includes a laser generator, the laser generator generating a laser beam which is projected onto a surface outside of the housing to create a line;
    a pendulum lock movable from an unlocked position to a locked position, wherein when the pendulum lock is in the locked position it prevents the pendulum assembly from rotating;
    a sensor disposed in the housing and configured to detect a freefall condition;
    wherein the pendulum lock moves from the unlocked position to the locked position when the sensor detects the freefall condition;
    further comprising a lock actuator, the lock actuator being movable from a blocking position to a release position;
    wherein, in the blocking position, the lock actuator blocks the pendulum lock from moving from the unlocked position to the locked position;
    wherein in the release position, the lock actuator allows the pendulum lock to move to the locked position;
    wherein a user operated actuator is configured to move the pendulum lock from the locked position to the unlocked position.

10. The laser generating device of claim 9, further comprising a controller housed in the housing and operatively connected to the sensor.

11. The laser generating device of claim 10, further comprising a wireless transmitter; and
    wherein the wireless transmitter transmits a signal to a remote electronic device when the sensor detects a freefall condition.

12. The laser generating device of claim 11, wherein the remote electronic device provides a display to a user in response to detection of the freefall condition.

13. The laser generating device of claim 12, wherein the remote electronic device comprises a computing device.

14. The laser generating device of claim 9, wherein the lock actuator includes a solenoid for moving the lock actuator.

15. The laser generating device of claim 14, wherein the controller operates the solenoid.

16. The laser generating device of claim 9, further comprising a wireless receiver configured to receive wireless signals; and
    wherein the controller is configured to move the lock actuator to the release position in response to receiving a lock actuation command through the wireless receiver from a remote electronic device.

17. The laser generating device of claim 9, wherein the free-fall condition comprises a g-force under a predetermined amount for a predetermined amount of time.

18. The laser generating device of claim 9, wherein the free-fall condition comprises a g-force under 0.1 for a predetermined amount of time.

19. A laser level system, comprising:
    a laser level comprising:
        a housing;
        a laser module assembly, the laser module assembly at least partially housed in the housing, the laser module assembly including a pendulum assembly configured to rotate under the effects of gravity and a laser module on the pendulum assembly;
        wherein the laser module includes a laser generator, the laser generator generating a laser beam;

a pendulum lock movable from an unlocked position to a locked position, wherein when the pendulum lock is in the locked position it prevents the pendulum assembly from rotating;

a wireless transceiver;

a remote computing device;

wherein the wireless transceiver transmits information regarding the laser level to the remote computing device;

wherein the remote computing device is configured to activate the pendulum lock so that the pendulum lock moves from the unlocked position to the locked position;

wherein the laser level further comprises a lock actuator, the lock actuator being movable from a blocking position to a release position;

wherein, in the blocking position, the lock actuator blocks the pendulum lock from moving from the unlocked position to the locked position;

wherein in the release position, the lock actuator allows the pendulum lock to move to the locked position;

wherein a user operated actuator is configured to move the pendulum lock from the locked position to the unlocked position.

\* \* \* \* \*